(12) United States Patent
Kim et al.

(10) Patent No.: US 7,601,186 B2
(45) Date of Patent: Oct. 13, 2009

(54) REFORMER AND FUEL CELL SYSTEM HAVING THE SAME

(75) Inventors: Ju-Yong Kim, Suwon-si (KR); Zin Park, Suwon-si (KR); Ji-Seong Han, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 464 days.

(21) Appl. No.: 11/159,985

(22) Filed: Jun. 22, 2005

(65) Prior Publication Data

US 2006/0014061 A1 Jan. 19, 2006

(30) Foreign Application Priority Data

Jun. 30, 2004 (KR) .................. 10-2004-0050672

(51) Int. Cl.
*B01J 7/00* (2006.01)
(52) U.S. Cl. ............................ 48/61; 429/19
(58) Field of Classification Search .............. 48/61, 48/127.9; 429/19
See application file for complete search history.

(56) References Cited

U.S. PATENT DOCUMENTS

| 4,650,727 | A | * | 3/1987 | Vanderborgh et al. | ......... 429/19 |
| 6,296,814 | B1 | | 10/2001 | Bonk et al. | |
| 2002/0168307 | A1 | * | 11/2002 | Seaba et al. | .................. 422/198 |
| 2004/0126288 | A1 | * | 7/2004 | Fuju et al. | .................... 422/202 |

FOREIGN PATENT DOCUMENTS

WO      WO 01/47800 A1     7/2001

\* cited by examiner

*Primary Examiner*—Alexa D Neckel
*Assistant Examiner*—Imran Akram
(74) *Attorney, Agent, or Firm*—Christie, Parker & Hale, LLP

(57) ABSTRACT

A reformer of a fuel cell system is provided. The reformer includes a reforming reaction section constructed with a plurality of pipelines having independent internal spaces to generate hydrogen from a fuel, and a housing assembly surrounding the reforming reaction section to circulate the fuel around an outer surface of the reforming reaction section to preheat the fuel before it is supplied to the reforming reaction section.

17 Claims, 5 Drawing Sheets

REFORMER AND FUEL CELL SYSTEM HAVING THE SAME

CROSS REFERENCE TO RELATED APPLICATION

This application claims priority to and the benefit of Korean patent application No. 10-2004-0050672 filed in the Korean Intellectual Property Office on Jun. 30, 2004, the entire disclosure of which is incorporated herein by reference.

FIELD OF THE INVENTION

The present invention relates to a fuel cell system, and more particularly to, a fuel cell system having an improved reformer.

BACKGROUND OF THE INVENTION

As is well known, a fuel cell is a system for generating electricity by directly converting oxygen and hydrogen contained in hydrocarbon materials such as methanol, ethanol, and natural gas into electric energy.

Fuel cells may be classified into different types based on the types of electrolytes used. Examples include phosphoric acid fuel cells, molten carbonate fuel cells, solid oxide fuel cells, polymer electrolyte membrane fuel cells, and alkaline fuel cells. Although these fuel cells are basically operated in accordance with the same principles, these fuel cells are different from each other in terms of types of fuels, operating temperatures, catalysts, and electrolytes.

Among these fuel cells, recently developed polymer electrolyte membrane fuel cells (hereinafter, referred to as PEMFCs) have shown excellent output characteristics, low operating temperatures, and fast starting and response characteristics. Therefore, PEMFCs have a wide range of applications including as mobile power sources for vehicles, as distributed power sources for homes or buildings, and as small-sized power sources for electronic apparatuses.

A fuel cell system employing a PEMFC generally includes a stack, a reformer, a fuel tank, and a fuel pump. The stack is a main body of the fuel cell. The fuel pump supplies a fuel stored in the fuel tank to the reformer. The reformer reforms the fuel to generate a hydrogen gas and supplies the hydrogen gas to the stack. As a result, the stack of the PEMFC generates electric energy through an electrochemical reaction between the hydrogen and oxygen.

The reformer in the fuel cell system generates the hydrogen from the hydrogen-containing fuel through a chemical catalytic reaction using thermal energy.

Generally, the reformer includes a reforming reaction section for generating the thermal energy to produce a hydrogen-containing reforming fuel from the fuel and a carbon-monoxide removing section for reducing the concentration of carbon monoxide contained in the hydrogen gas.

The reforming reaction section of the reformer is operated with exothermic and endothermic reactions using a catalyst. The reforming reaction section comprises a heat generating section for generating heat through a catalytic oxidation of a portion of the fuel reacting with air, and a heat absorbing section for absorbing the reaction heat and generating the hydrogen through a catalytic reforming reaction.

Since a conventional reformer comprises individual heat generating and absorbing sections, the heat generated by the heat generating section must be transferred to the heat absorbing section. Therefore, the heat generating and absorbing sections cannot directly exchange heat, so that the resulting heat transfer efficiency is low.

In addition, since a conventional reformer comprises individual heat generating and absorbing sections, it is difficult to implement a small-sized fuel cell system.

In addition, since the fuel must be heated during start-up before it is supplied to the reformer of a conventional fuel cell system, the system's performance efficiency deteriorates due to the energy consumption associated with the preliminary heating of the fuel.

SUMMARY OF THE INVENTION

One embodiment of the present invention is directed to a reformer of a fuel cell system with a simple structure that provides improved reaction and thermal efficiencies of the fuel cell system.

In another embodiment of the present invention, a fuel cell system is provided that uses the aforementioned reformer.

According to one embodiment of the present invention, a reformer of a fuel cell system comprises: a reforming reaction section constructed of first and second concentric pipelines, the second pipeline located within the first pipeline, with a reforming catalyst in the space between the two concentric pipelines, and a housing assembly surrounding the entire reforming reaction section. Fuel enters the housing and is circulated around an outer surface of the first pipeline where it is preheated. The preheated fuel then enters the space between the concentric pipelines where it is reformed to produce hydrogen gas. The inner or second pipeline includes an oxidation catalyst, and a fuel and air mixture is introduced within the second pipeline where an oxidation reaction of the fuel generates heat for the reforming reaction.

In one embodiment of the invention, a portion of the reforming catalyst may be substituted with a water-gas shift catalyst to reduce the amount of carbon monoxide in the hydrogen gas.

In one embodiment of the invention, the first and second pipelines may be constructed of a thermally-conductive material.

In another embodiment, the first and second concentric pipelines are arranged in a series of connected U-bends forming a serpentine arrangement.

In still another embodiment, the housing assembly includes a plurality of baffles to generally guide the fuel to flow along the outer surface of the reforming reaction section according to the shape of the reforming reaction section.

In addition, in the reforming reaction section, an inlet may be provided to the one end of the second pipeline, and an outlet may be provided to the other end of the second pipeline, wherein the both ends of the second pipeline pass through the housing assembly.

In addition, an inlet may be provided to the one end of the first pipeline, and the one end may be located within the housing assembly providing a direct path for the preheated fuel which has passed through the housing assembly. An outlet may be provided at the other end of the first pipeline, extending through the housing assembly.

In addition, the baffles may be disposed between the straight portions of the U-bends that make up the reforming reaction section, wherein the baffles are alternately connected to inner side walls of the housing body.

In another embodiment of the invention, the housing assembly includes at least one fuel injection hole for supplying the fuel into the housing assembly.

In addition, the outlets of the first and second pipes may pass through the housing body to externally extend from the housing assembly, wherein at least one bushing having first and second connection holes connected to the outlets of the first and second pipelines is provided to the outlets of the first and second pipelines.

In another embodiment of the invention, each of the housing body and the cover member may have a double-wall structure having an inner wall and an outer wall separated from one another to form an insulating space between the inner and outer walls.

In a variation on this embodiment of the invention, the space between the inner and outer walls may be maintained under a vacuum.

In another variation on this embodiment of the invention, the inner and outer walls may be made of an insulating material, whether metal or nonmetal.

In still another embodiment of the invention, the reformer may further comprise a vaporization section connected to the inlet of the second pipeline.

According to another embodiment of the present invention, a fuel cell system is provided that includes a reformer as described above, and at least one electricity generator for generating electric energy through an electrochemical reaction between the hydrogen and oxygen.

For such an embodiment of the invention, the fuel cell system may further comprise a fuel supply unit for supplying fuel to the reformer, wherein the fuel supply unit comprises: a first tank for storing the fuel; a second tank for storing water; and a fuel pump connected to the first and second tanks.

For such an embodiment of the invention, the fuel cell system may further comprise an oxygen supply unit for supplying oxygen to the reformer and the electricity generators, wherein the oxygen supply unit comprises an air pump.

In yet another embodiment of the invention, the fuel cell system may further comprise a recycle line for recycling non-reacted hydrogen discharged from the electricity generators to the reformer to be used as a fuel for providing heat to the reformer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
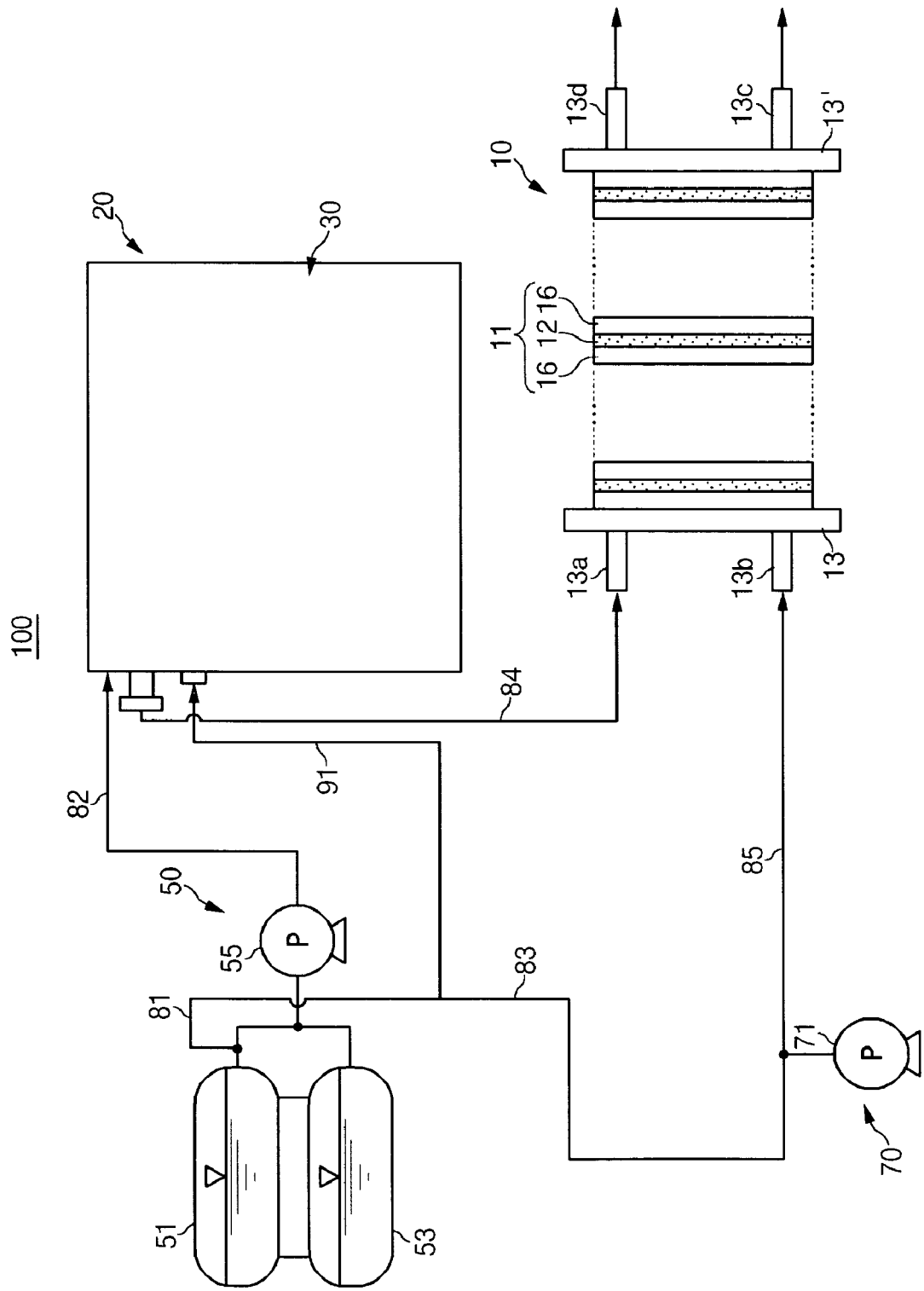
FIG. 1 is a schematic block diagram illustrating a construction of a fuel cell system according to a first embodiment of the present invention.

FIG. 1 is a schematic diagram illustrating an entire construction of a fuel cell system according to a first embodiment of the present invention.

The fuel used to generate electricity in the fuel cell system 100 may comprise a liquid or gas hydrogen-containing fuel such as methanol, ethanol, and natural gas. In the following description of the embodiment, liquid fuel is exemplified.

In addition, the fuel cell system 100 may utilize pure oxygen stored in an additional storage device or air as an oxidant for reacting with hydrogen. In the following description of the embodiment, the use of air is exemplified.

Referring to FIG. 1, the fuel cell system 100 includes a reformer 20 for generating a hydrogen-containing gas from a liquid fuel, a stack 10 for generating electric energy through a chemical reaction between hydrogen and oxygen, a fuel supply unit 50 for supplying the fuel to the reformer 20, and an oxygen supply unit 70 for supplying oxygen to the stack 10 and the reformer 20.

The fuel cell system 100 employs a polymer electrolyte membrane fuel cell (PEMFC) using the reformer 20 to generate the hydrogen gas from the fuel and the stack 10 to generate electric energy through an electrochemical reaction between oxygen and the hydrogen gas.

The fuel supply unit 50 includes a first tank 51 for storing the liquid fuel, a second tank 52 for storing water, and a fuel pump 55 connected to the first and second tanks 51 and 53. The fuel pump 55 pumps a fuel mixture comprising water and fuel to the reformer 20.

The oxygen supply unit 70 comprises an air pump 71 for pumping air to the reformer 20 and the stack 10.

Figure 2:
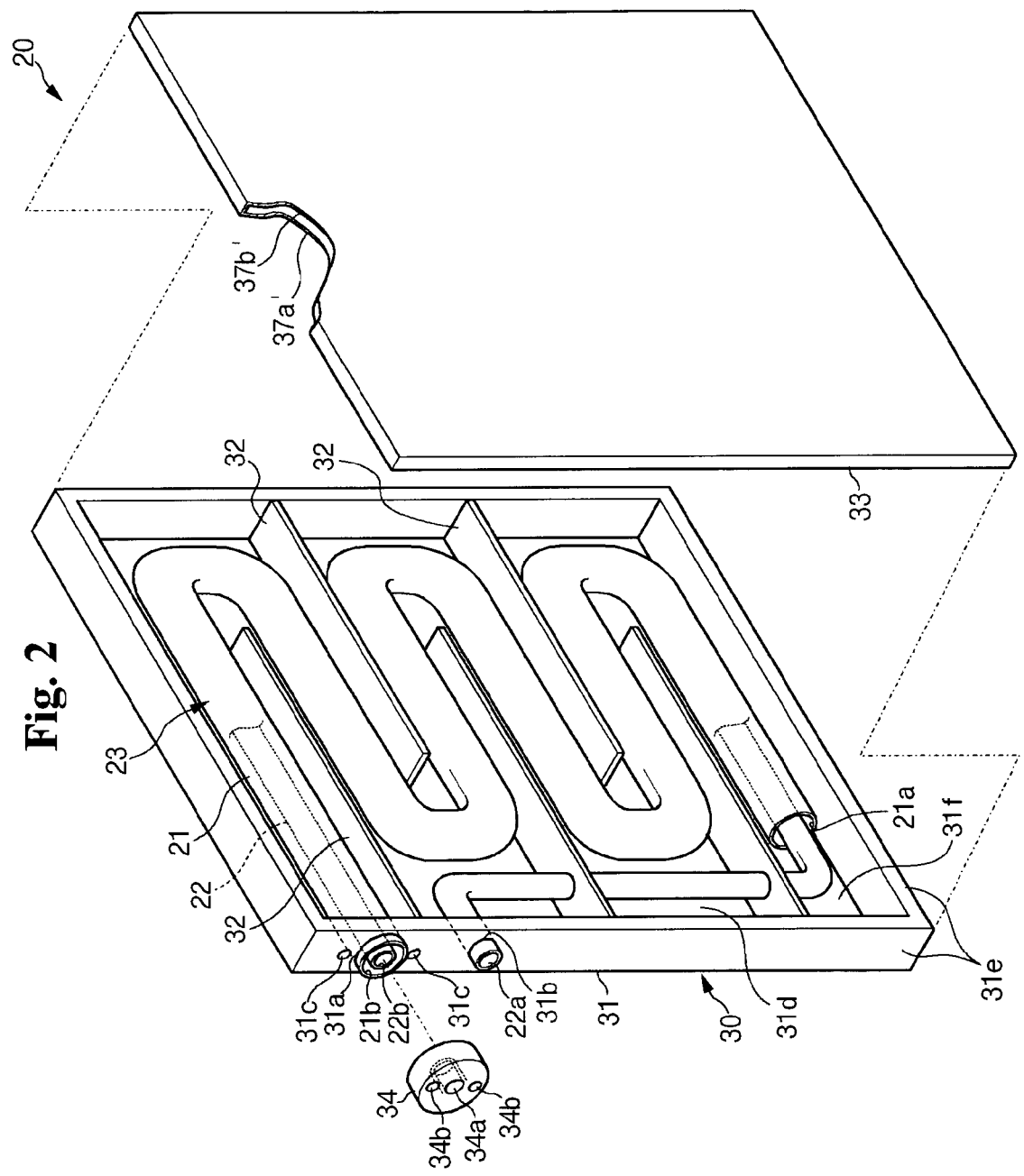
FIG. 2 is an exploded perspective view of a reformer according to the first embodiment of the present invention.
Figure 3:
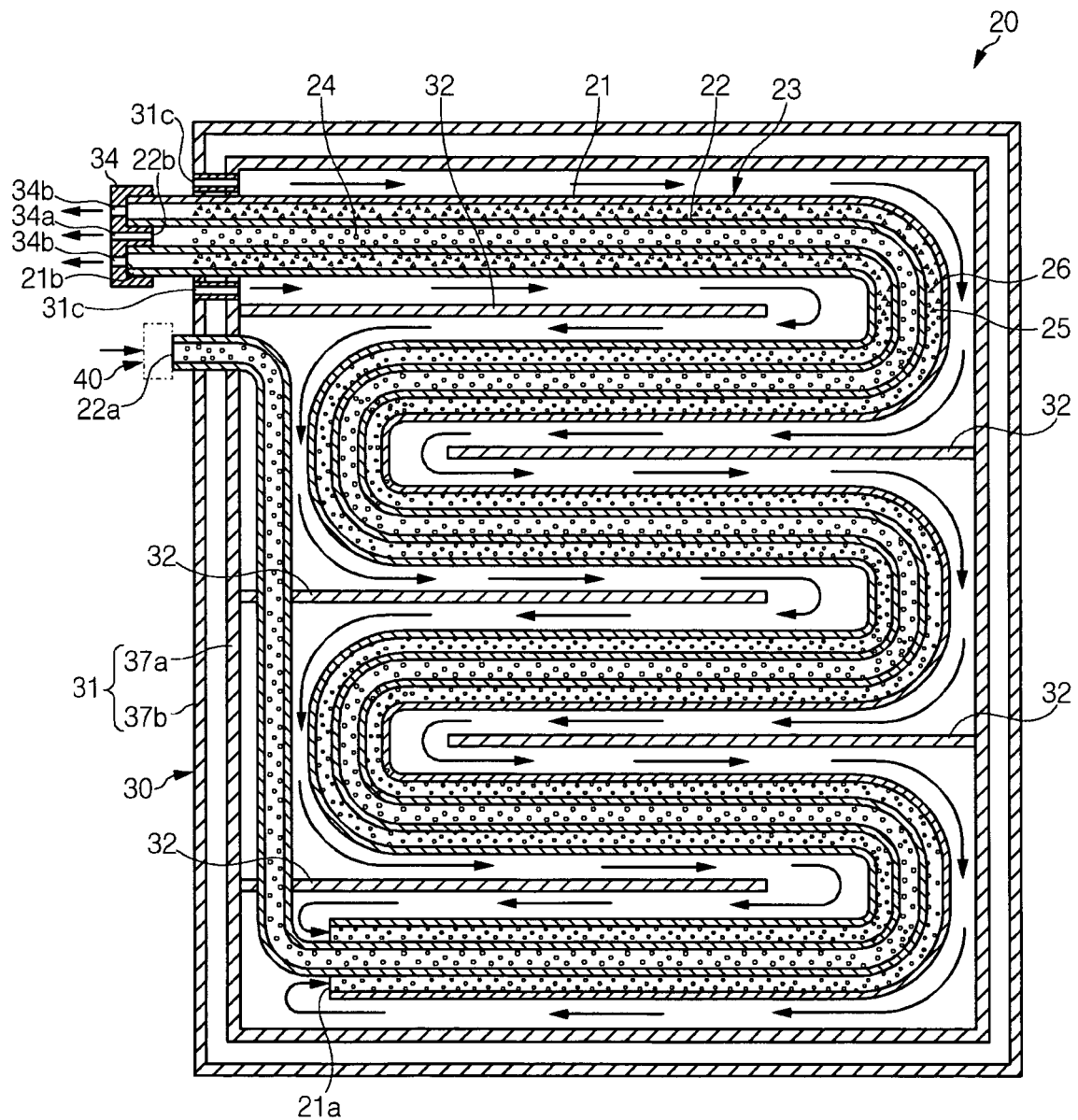
FIG. 3 is a cross sectional view of a reformer according to the first embodiment of the present invention.

FIG. 2 is an exploded perspective view illustrating the reformer of FIG. 1, and FIG. 3 is a coupled cross-sectional view of the reformer of FIG. 2.

Referring to FIGS. 1 to 3, the reformer 20 includes a reforming reaction section 23 having at least two concentric pipelines, each having an independent internal space. The reformer 20 generates thermal energy for use by the reforming reaction section 23 though a catalytic oxidation reaction between the liquid fuel and air. In addition, the reforming reaction section 23 generates a hydrogen gas stream from the fuel mixture through a catalytic reforming reaction using the thermal energy.

According to this embodiment of the present invention, the reforming reaction section 23 includes a first pipeline 21; and a second pipeline 22 disposed within the first pipeline 21. The first pipeline 21 is a cylindrical pipe having a predetermined cross sectional area and having substantially opened ends. The second pipeline 22 is a cylindrical pipe having a cross sectional area smaller than that of the first pipeline 21 and having substantially opened ends. An outer surface of the second pipeline 22 is separated from an inner surface of the first pipeline 21 by a predetermined distance, while the centers of the first and second pipelines 21 and 22 are coincident with each other. The first and second pipelines 21 and 22 may be made of a thermally conductive material such as stainless steel, aluminum, copper, or iron.

One end of the second pipeline 22 serves as an inlet 22a through which the liquid fuel and air are injected into the internal space of the second pipeline 22. The other end of the second pipeline 22 serve as an outlet 22b through which a combustion gas resulting from the oxidation reaction between the liquid fuel and air is discharged.

An oxidation catalyst 24 for promoting the oxidation reaction between the liquid fuel and air is disposed in the internal space of the second pipeline 22. Fuel from the first tank 51 and air from the air pump 71 are fed through the first supply line 81 and the third supply line 83, respectively, and join at a combined line 91 which feeds the mixture to the inlet 22a of the second pipeline.

In this embodiment, the internal space of the second pipeline 22 is filled with an oxidation catalyst 24 for promoting the oxidation reaction between the liquid fuel and the air to generate heat. The oxidation catalyst 24 may have a structure where a catalytic material such as platinum (Pt) or ruthenium (Ru) is contained on pellet-shaped carriers made of alumina ($Al_2O_3$), silica ($SiO_2$), or titania ($TiO_2$).

An inlet 21a is provided on one end of the first pipeline 21 through which a mixture of the liquid fuel and water is injected into a space between the first and second pipelines 21 and 22. An outlet 21b is provided on the other end of the first pipeline through which the hydrogen gas is discharged from the space between the first and second pipelines 21 and 22 in the reformer 20.

The space between the first and second pipelines 21 and 22 is filled with a reforming catalyst 25 for promoting the reforming reaction of the fuel mixture. The reforming catalyst 25 functions to generate hydrogen gas from the fuel mixture. The reforming catalyst 25 may have a structure where a catalytic material such as platinum (Pt) or ruthenium (Ru) is contained on pellet-shaped carriers made of alumina ($Al_2O_3$), silica ($SiO_2$), or titania ($TiO_2$).

In addition, as shown in the figure, the reforming reaction section 23 according to the embodiment may further comprise a water-gas shift catalyst 26 disposed in a portion of the space of the first and second pipelines 21 and 22. The water-gas shift catalyst 26 functions to reduce the concentration of carbon monoxide contained in the hydrogen gas through a water-gas shift (WGS) reaction of the hydrogen gas generated from the fuel mixture.

In one embodiment, the water-gas shift catalyst 26 is disposed in the vicinity of the outlet 21b in the space between the first and second pipelines 21 and 22. The water-gas shift catalyst 26 may have a structure in which a catalytic material such as copper (Cu), zinc (Zn), iron (Fe) or chromium (Cr) is contained on pellet-shaped carriers made of alumina ($Al_2O_3$), silica ($SiO_2$), or titania ($TiO_2$).

In one embodiment of the invention, the reforming reaction section 23 is made up of a plurality of connected U-bends forming a serpentine shape. However, the reforming reaction section 23 is not limited to such a structure.

When the liquid fuel and air are supplied into the internal space of the second pipeline 22, the oxidation catalyst 24 generates reaction heat though a catalytic oxidation reaction between the liquid fuel and air. The reaction heat is transferred to the first pipeline 21 through the second pipeline 22.

Next, when the fuel mixture is supplied into the space between the first and second pipelines 21 and 22, the fuel mixture absorbs the reaction heat, and upon contacting the reforming catalyst 25, generates the hydrogen gas through the catalytic reforming reaction. In addition, the water-gas shift catalyst 26 reduces the concentration of carbon monoxide contained in the hydrogen gas.

In this embodiment, in order to maximize the thermal energy efficiency of the thermal energy generated from the reforming reaction section 23, the reformer 20 further comprises a housing assembly 30 surrounding the first pipeline 21.

The fuel mixture is circulated within the housing assembly 30 and contacts the outer surface of the reforming reaction section 23 where it absorbs residual heat from the reforming reactions to preheat the fuel mixture. The preheated fuel mixture is then supplied into the reforming reaction section 23.

In this embodiment of the invention, the housing assembly 30 includes a housing body 31 defining an accommodation space for accommodating the reforming reaction section 23, a plurality of baffles 32 for guiding the fuel mixture to flow along the outer surface of the reforming reaction section 23 generally according to the shape of the reforming reaction section 23, and a cover plate 33 coupled to the housing body 31 to seal the accommodation space.

As shown in the figure, the housing body 31 comprises a substantially rectangular rear plate 31d. Side walls 31e having a predetermined height are provided along edges of the rear plate 31d to form an accommodation space 31f with an open front surface.

On one of the side walls 31e, there are provided a first hole 31a through which the outlets 21b and 22b of the first and second pipelines 21 and 22 pass, a second hole 31b through which the inlet 22a of the second pipeline 22 passes, and at least one fuel injection hole 31c for injecting the fuel mixture into the accommodation space 31f.

The first and second tanks 51 and 52 of the fuel supply unit 50 may be connected to the fuel injection hole 31c through a second supply line 82 as shown in FIG. 1.

According to this embodiment, the outlets 21b and 22b of the first and second pipelines 21 and 22 pass through the first hole 31a to externally extend from the accommodation space 31f. In addition, the inlet 22a of the second pipeline 22 also passes through the second hole 31b to extend from the accommodation space 31f. The inlet 21a of the first pipeline 21 is located within the accommodation space 31f of the housing body 31.

In addition, a bushing 34 coupled to the outlets 21b and 22b of the first and second pipelines 21 and 22 may be provided to the housing body 31.

The bushing 34 functions to channel the discharge of the combustion gas of the liquid fuel and air though the outlet 22b of the second pipeline 22 and the discharge of the hydrogen gas through the outlet 21b of the first pipeline 21.

The bushing 34 comprises a first connection hole 34a connecting with the outlet 22b of the second pipeline 22 and a second connection hole 34b connecting with the outlet 21b of the first pipeline 21. In one variation as will be described in further detail later, the second connection hole 34b may be connected to the electricity generators 11 through a fourth supply line.

The baffles 32 define a fluid passage that generally corresponds with the shape of the reforming reaction section 23 in the accommodation space 31f of the housing body 31, so that the fuel mixture of fuel and water that is injected into the accommodation space 31f through the fuel injection hole 31c can be circulated along the outer surface of the first pipeline 21.

The baffles 32 define such a fluid passage in order to better transfer the thermal energy from the reforming reaction section 23 to the fuel mixture as preheat. The preheated fuel mixture is then supplied to the inlet 21a of the first pipeline 21.

More specifically, the baffles 32 are disposed between the straight lines that together form the reforming reaction section 23 and are alternately connected to inner side walls of the housing body 31.

The widths of the baffles 32 are substantially equal to those of the side walls of the housing body 31. The one end of each baffle member 32 is connected to one of left and right inner side walls of the housing body 31, and the other end is separated by a predetermine distance from the other inner side wall facing the aforementioned inner side wall.

As a result, since one end of each of the baffles 32 is alternately connected to the inner side walls, the baffles 32 define a zigzag fluid passage corresponding to the serpentine shape of the reforming reaction section 23 in the accommodation space 31f of the housing body 31.

The cover plate 33 functions to seal the accommodation space 31f of the housing body 31. The cover plate 33 is coupled to the front surface of the housing body 31 by any known means such as with screws or bonding material.

During the operation of the reformer 20, to reduce the amount of thermal energy lost through the housing body 31 and the cover member 33, an insulating structure may optionally be provided to the housing assembly 30.

As the insulating structure for the housing body 31, the housing body 31 and the cover members 33 include inner walls 37a and 37a' entirely surrounding the reforming reaction section 23, and outer walls 37b and 37b' separated from the inner walls 37a and 37a' by a predetermined distance. In still another variation, a vacuum space is formed between the inner walls 37a and 37a' and the outer walls 37b and 37b'.

The inner walls 37a and 37a' and the outer walls 37b and 37b' may be made of a material such as SUS (Steel Use Stainless), a metal insulating material such as aluminum (Al) or zirconium (Zr), or a nonmetal insulating material such as a ceramic. Furthermore, the inner walls 37a and 37a' and the outer walls 37b and 37b' may be made of the same material or different materials.

In order to further promote the catalytic oxidation reaction between the liquid fuel and air injected into the internal space of the second pipeline 22 through the inlet 22a of the second pipeline 22, the reformer 20 may further comprises a vaporization section 40 disposed in the vicinity of the inlet 22a. The vaporization section 40 uses known methods to substantially vaporize the liquid fuel.

The vaporization section 40 is connected to the inlet 22. The vaporization section 40 may comprise a heater such as an electric heater. As one example, the vaporization section 40 comprises an electric coil of which both ends are electrically connected to a power supplier. Where a gaseous fuel such as a natural gas is used as the hydrogen-containing fuel instead of the liquid fuel, the vaporization section 40 may be omitted.

Figure 4:
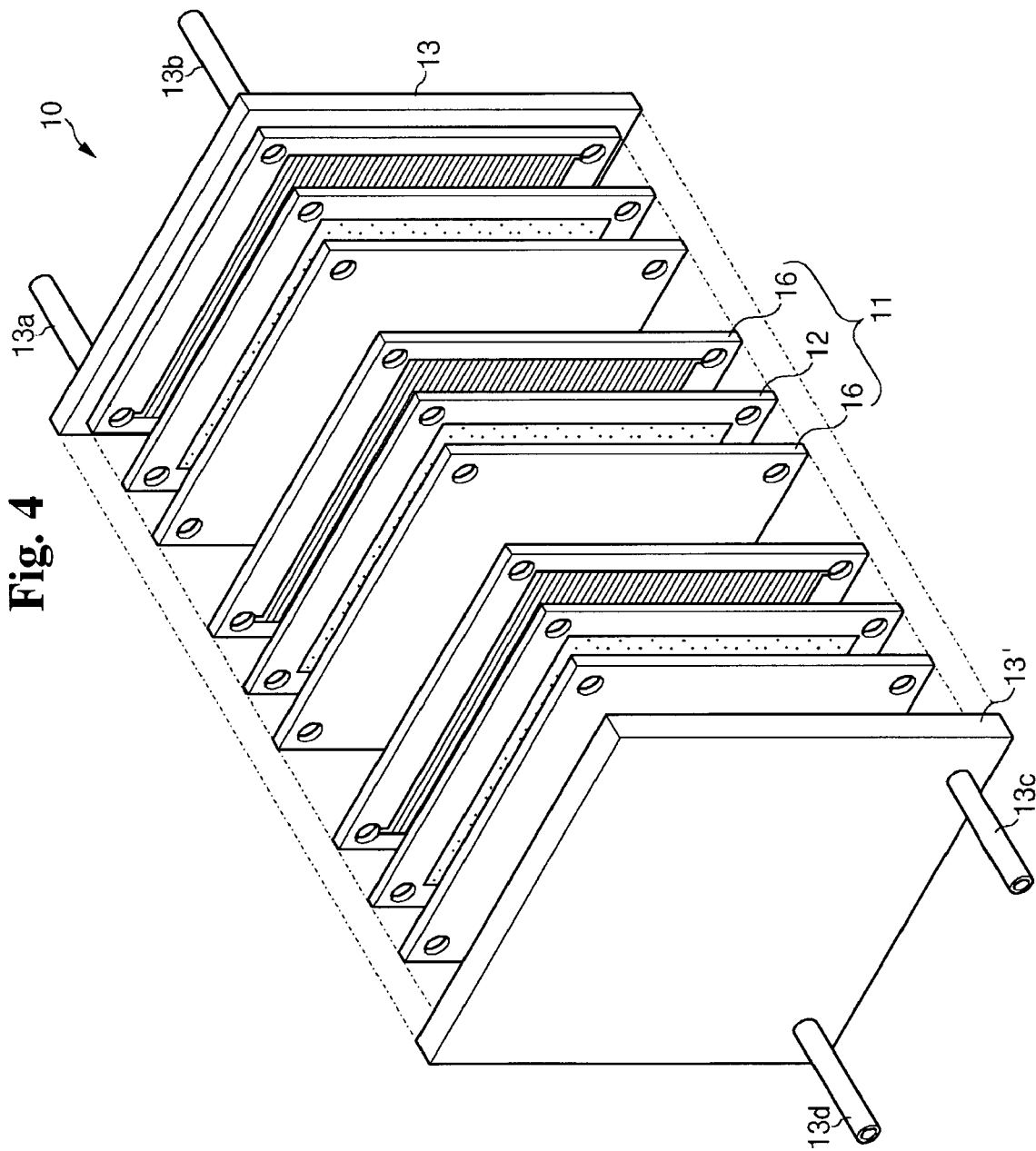
FIG. 4 is an exploded perspective view of a stack according to the first embodiment of the present invention.

FIG. 4 is an exploded perspective view illustrating a structure of the stack shown in FIG. 1.

Referring to FIGS. 1 and 4, the stack 10 in the fuel cell system 10 according to the present invention comprises at least one electricity generator 11 for generating electric energy through oxidation and reduction reactions between the hydrogen gas and the oxygen contained in air.

Each electricity generator 11 is a unit fuel cell for generating electricity in which separators 16 are disposed on both surfaces of a membrane-electrode assembly (MEA) 12. The stack 10 according to the embodiment is constructed by stacking a plurality of the unit cells.

The outermost sides of the stack 10 may be provided with additional pressing plates 13 and 13' for pressing the plurality of electricity generators 11 to be in a close contact with each other. Alternatively, instead of the pressing plates 13, 13', the stack 10 according to the present invention may utilize the separators 16 disposed at the outermost sides of the electricity generators 11 as pressing plates. Furthermore, in addition to performing a pressing function, the pressing plates 13 and 13' also function as separators as described above.

The MEA 12 has a structure where anode and cathode electrodes are attached on both sides of the MEA 12, and an electrolyte membrane is interposed between the two electrodes.

The anode electrode receives the hydrogen gas through the separator 16. The anode electrode is constructed with a catalyst for decomposing the hydrogen gas into electrons and hydrogen ions and a gas diffusion layer (GDL) for promoting movement of the electrons and the hydrogen gas.

The cathode electrode receives the air through the separator 16. The cathode electrode is constructed with a catalyst for reacting the electrons, the hydrogen ions, and oxygen contained in the air to generate water, and a gas diffusion layer for promoting movement of the oxygen.

The electrolyte membrane has an ion exchange function for moving the hydrogen ions generated by the catalyst of the anode electrode into the catalyst of the cathode electrode.

Each separator 16 functions as a conductor for connecting the anode electrode and the cathode electrode in series to each other, and also as a passage for supplying the hydrogen gas and the air necessary for the oxidation and reduction reactions of the MEA 12 to the anode electrode and the cathode electrode.

More specifically, a hydrogen passage for supplying the hydrogen gas to the anode electrode is formed on the one surface of the separator 16 in close contact with the anode electrode of the MEA 12, and fluid channel 19 used as an air passage for supplying the air to the cathode electrode is formed on the other surface of the separator 16 in close contact with the cathode electrode of the MEA 12.

One pressing plate 13 is provided with a first inlet 13a for supplying the hydrogen gas to the hydrogen passage of the separators 16, a second inlet 13b for supplying the air to the air passage of the separators 16, and the other pressing plate 13' is provided with a first outlet 13c for discharging the non-reacted hydrogen gas in the anode electrode of the MEA 12, and a second outlet 13d for discharging the non-reacted air containing the moisture generated through the composition reaction between hydrogen and oxygen in the cathode electrode of the MEA 12.

The first inlets 13a and the second connection hole 34b of the housing assembly 30 are connected to each other through the fourth supply line 84, as described above. In addition, the second inlet 13b and the air pump 71 are connected to each other though a fifth supply line 85.

Now, operations of the fuel cell system according to the first embodiment of the present invention will be described in detail.

First, the fuel pump 55 is driven to supply the fuel stored in the first tank 51 to the inlet 22a of the second pipeline 22 through the first supply line 81.

At the same time, the air pump is driven to supply the air to the inlet 22a of the second supply line 22 through the third supply line 83. Here, the liquid fuel passing through the first supply line 81 and the air passing through the third supply line 83 are combined into the combined line 91 and supplied to the inlet 22a of the second pipeline 22.

During the process, the liquid fuel and air pass through the vaporization section 40 and are injected through the inlet 22a of the second pipeline 22 into the internal space of the second pipeline 22.

The vaporized fuel and air passing through the second pipeline 22 are subject to the catalytic oxidation reaction in the oxidation catalyst 24. In the process, reaction heat is generated from the internal space of the second pipeline 22. The reaction heat is transferred from the second pipeline 22 into the space between the first and second pipelines 21 and 22.

The combustion gas having a relatively high temperature generated within the second pipeline 22 is discharged through the outlet 22b of the second pipeline 22.

The fuel pump 55 is then driven to supply the liquid fuel stored in the first tank 51 and the water stored in the second tank 52 to the fuel injection hole 31c of the housing body 31.

The liquid fuel and water injected into the housing body 31 are circulated along the fluid passage partitioned by the baffles 32 in the accommodation space 31f of the housing body 31 to substantially be in contact with the first pipeline 21 and thereby preheat the liquid fuel and water.

The thermal energy is primarily insulated by the housing body 31 and the inner wall 37a of the cover member 33, and secondarily insulated by the vacuum space and the outer wall 37b of the cover member 33.

By maintaining the thermal energy within the housing body 31 and the cover member 33, the loss of thermal energy of the reforming reaction section 23 can be reduced, improving the reaction efficiency and thermal efficiency of the reformer 20.

Subsequently, the fuel mixture of the preheated liquid fuel and water is injected into the space between the first and second pipelines 21 and 22 through the inlet 21a of the first pipeline 21 in the accommodation space 31f of the housing body 31. Next, the fuel mixture passes though the reforming catalyst 25 disposed in the space between the first and second pipelines 21 and 22 and absorbs the thermal energy provided from the second pipeline 22.

During the process, the fuel mixture passes through the reforming catalyst 25 where it reacts to generate the hydrogen gas containing hydrogen and some carbon dioxide with some carbon monoxide as a by-product of the reforming catalytic reaction. The hydrogen gas subsequently passes through the water-gas shift catalyst 26 where the concentration of carbon monoxide contained in the hydrogen gas is reduced.

Subsequently, when the hydrogen gas is discharged through the outlet 21b of the first pipeline 21, the hydrogen gas is supplied to the first inlet 13a of the stack 10 through the fourth supply line 84.

At the same time, the air pump 71 is driven to supply the air to the second inlet 13b of the stack 10 through the fifth supply line 85.

Therefore, the hydrogen gas is supplied to the anode electrode of the MEA 12 through the hydrogen passages of the separators 16. The air is supplied to the cathode electrode of the MEA 12 through the air passage of the separators 16.

The anode electrode decomposes the hydrogen gas into electrons and protons (hydrogen ions) through the oxidation reaction of the hydrogen gas. The protons are transferred to the cathode electrode through the electrolyte membrane, and the electrons are transferred to the cathode electrode of the adjacent MEA 12, but not through the electrolyte membrane but through the separators 16. As a result, the transfer of electrons causes an electric current, and heat and water are generated as by-products.

When the electric energy is generated from the electricity generators 11, some portion of the hydrogen supplied to the anode electrode of the MEA 12 is reacted, and remaining non-reacted hydrogen is discharged through the first outlet 13c.

In addition, when the electric energy is generated from the electricity generators 11, some portion of the air supplied to the cathode electrode of the MEA 12 is reacted, and remaining air contained in a high-temperature and high-humidity state is discharged through the second outlet 13d.

Figure 5:
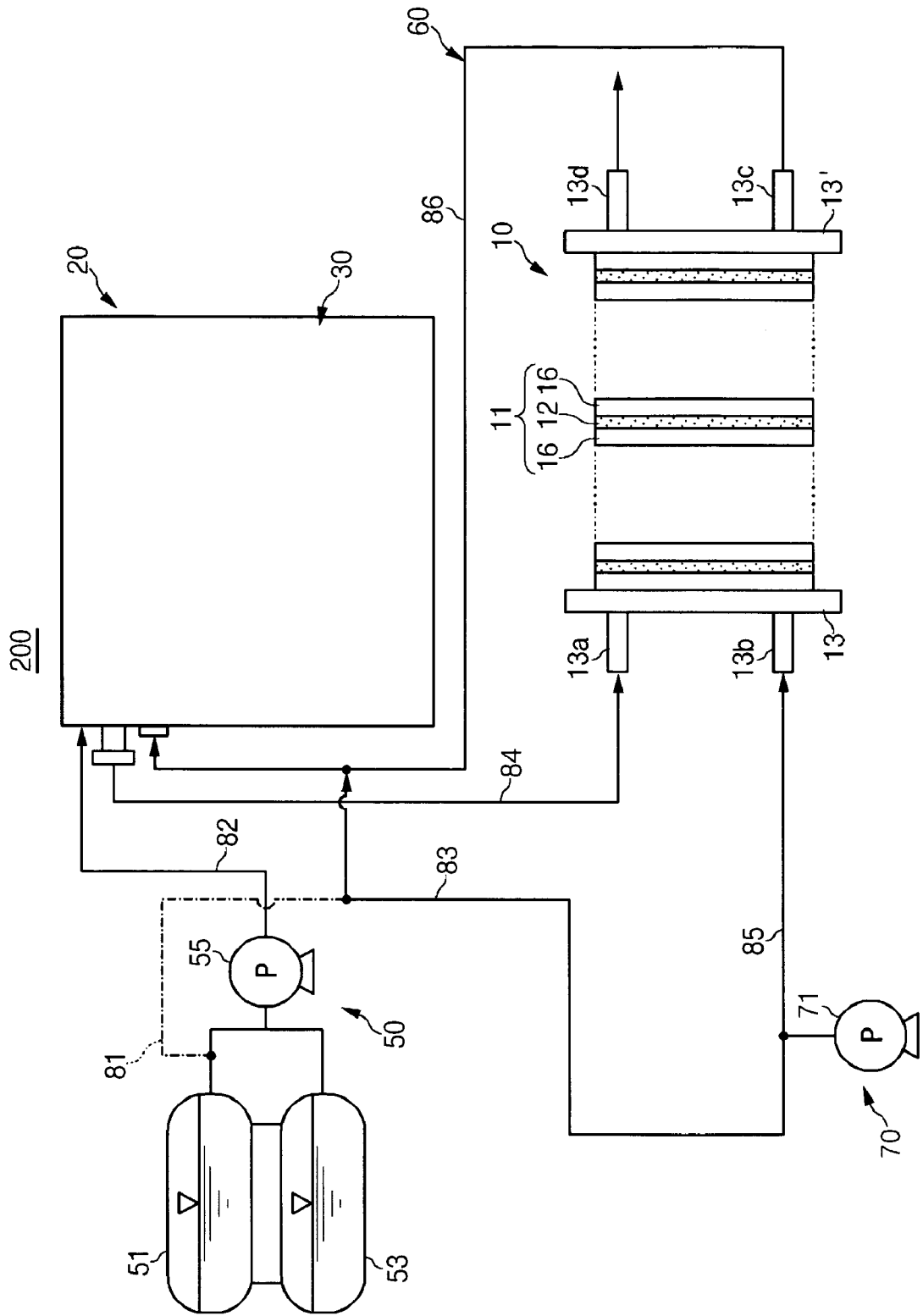
FIG. 5 is a schematic block diagram illustrating a construction of a fuel cell system according to a second embodiment of the present invention.

FIG. 5 is a schematic view illustrating a fuel cell system modified according to the second embodiment of the present invention. The fuel cell system 200 according to the second embodiment of the present invention has the same basic structure and components as the fuel cell system according to the first embodiment. The fuel cell system 200 comprises a structure where non-reacted hydrogen discharged from the first outlet 13c of the stack 10 is supplied together with air from the oxidant supply unit 70 to the internal space of the second pipeline 22.

According to this embodiment of the invention, a circulation loop 60 is provided for recycling at least a portion of the non-reacted hydrogen from the stack 10 to the inlet 22a of the second pipeline 22 of the reformer 20. The circulation loop 60 includes a sixth supply line 86 for connecting the first outlet 13c of the stack 10 and the inlet 22a of the second supply line 22.

The inlet 22a of the second pipeline 22 and the air pump 71 are connected to each other through the third supply line 83 as illustrated in the first embodiment.

The other components of the fuel cell system 200 according to the second embodiment have the same construction as those of the fuel cell system 100 according to the first embodiment.

Now, operations of the fuel cell system according to the second embodiment of the present invent will be described in detail.

First, when the fuel cell system 200 is initially driven, thermal energy is generated by a series of operations similar to the first embodiment. By using the thermal energy, a hydrogen gas is generated from a mixture of fuel and water. Next, electric energy is generated through an electrochemical reaction between the fuel and oxygen.

During the process, when the electric energy is generated from the electricity generators 11, some portion of hydrogen contained in a hydrogen gas supplied to the anode electrode of the MEA 12 is reacted, and remaining non-reacted hydrogen gas is discharged through the first outlet 13c of the stack 10.

Subsequently, a general valve (not shown) provided to the first supply line 81 is operated to shut first supply line 81 (indicated by a virtual line in the figure). At this time, rather than using a portion of the fuel as the feed to the inlet 22a of the second pipeline, the non-reacted hydrogen discharged from the outlet 13c is supplied to the inlet 22a of the second pipeline 22 through the sixth supply line 86.

At the same time, the air pump 71 continues to supply the air to the inlet 22a of the second pipeline 22 through the third supply line 83.

As a result, reaction heat is generated from the internal space of the second pipeline 22 through the oxidation reaction between the non-reacted hydrogen and air. Namely, according to the second embodiment, the non-reacted hydrogen gas discharged from the stack 10 can be used as a source of fuel, further improving the efficiency of the fuel cell system.

The other operations of the fuel cell system 200 according to the second embodiment are the same as those of the fuel cell system 100 according to the first embodiment. Therefore, detailed description thereof will be omitted.

According to certain embodiments of the present invention, since the thermal energy needed for a reforming reaction of a fuel is rapidly transferred by a double-pipe reformer, it is possible to further improve the performance and thermal efficiency of the whole fuel cell system and to implement a small-sized fuel cell system.

In addition, according to an embodiment of the present invention, since the fuel supplied to a reformer at the time of starting up the fuel cell system is preheated, it is possible to further improve the operation performance and thermal efficiency of the whole fuel cell system.

In addition, according to an embodiment of the present invention, since the thermal energy needed for a reforming reaction is thermally isolated, it is possible to improve the reaction and thermal efficiencies of a reformer.

In addition, according to an embodiment of the present invention, since a non-reacted hydrogen gas discharged from electricity generators of a stack can be reused as an energy source for a reformer, it is possible to further improve the performance and thermal efficiency of the whole fuel cell system.

Although exemplary embodiments of the present invention have been described, the present invention is not limited to the embodiments, but may be modified in various forms without departing from the scope of the appended claims, the detailed description, and the accompanying drawings of the present invention. Therefore, it is natural that such modifications belong to the scope of the present invention.

What is claimed is:

1. A reformer of a fuel cell system of the type where a reformer feed is preheated in a reformer feed preheat section and then introduced to a reforming reaction space in which the reformer feed is reacted to generate a reformed gas, the reformer comprising:
    a reforming reaction section comprising:
        a first pipeline defining an inlet to the reforming reaction space and an outlet from the reforming reaction space;
        a second pipeline having a cross sectional area smaller than the first pipeline, the second pipeline disposed within the first pipeline wherein the space between the first and second pipelines defines the reforming reaction space;
        an oxidation catalyst disposed in an internal space of the second pipeline; and
        a reforming catalyst disposed in the reforming reaction space; and
    a housing surrounding the reforming space and defining the reformer feed preheat section in which the reformer feed is preheated by direct contact with an outer wall of the first pipeline and from which the preheated reformer feed enters the inlet to the reforming reaction space.

2. The reformer of claim 1, further comprising a water-gas shift catalyst disposed in a portion of the reforming reaction space.

3. The reformer of claim 1, wherein each of the first and second pipelines is constructed of a thermally-conductive material.

4. The reformer of claim 1, wherein the reforming reaction section comprises a plurality of straight sections connected to one another to form a serpentine shape.

5. The reformer of claim 1, wherein the housing assembly comprises:
    a housing body defining an accommodation space adapted to the reforming reaction section;
    at least one baffle disposed in the accommodation space to guide the reformer feed to flow along an outer surface of the first pipeline according to the shape of the reforming reaction section; and
    a cover plate coupled to the housing body to seal the accommodation space.

6. The reformer of claim 5, further comprising an inlet to the second pipeline that passes through the housing body, and an outlet from the second pipeline that passes through the housing body.

7. The reformer of claim 5 wherein the reforming reaction section comprises a plurality of straight sections connected to one another to form a serpentine shape and the housing assembly comprises a plurality of baffles corresponding to the straight sections of the reforming reaction section so that the baffles define a flow path for the reformer feed that generally corresponds to the serpentine shape of the reforming reaction section.

8. The reformer of claim 5, wherein the housing body comprises at least one fuel injection hole for supplying the reformer feed into the accommodation space.

9. The reformer of claim 5, wherein an outlet of the second pipeline and the outlet of the first pipeline pass through the housing body via a bushing.

10. The reformer of claim 5, wherein each of the housing body and the cover has a double-wall structure defined by an outer wall spaced a distance from an inner wall to form an insulation space between the outer and inner walls.

11. The reformer of claim 10, wherein the insulation space is maintained under a vacuum.

12. The reformer of claim 10, wherein the inner and outer walls are made of a material selected from the group consisting of metal insulating materials, nonmetal insulating materials, and combinations thereof.

13. The reformer of claim 6, further comprising a vaporization section connected to the inlet of the second pipeline.

14. A fuel cell system comprising:
    the reformer of claim 1; and
    at least one electricity generator adapted to generate electric energy through an electrochemical reaction between hydrogen and oxygen.

15. The fuel cell system of claim 14, further comprising:
    a fuel tank;
    a water tank; and
    a fuel pump connected to the fuel tank and the water tank.

16. The fuel cell system of claim 14, further comprising an air pump adapted to supply oxygen to the reformer and the electricity generators.

17. The fuel cell system of claim 14, further comprising a recirculation line for supplying a stream of non-reacted hydrogen from the electricity generators to the reformer.

* * * * *